(12) United States Patent
Hu et al.

(10) Patent No.: US 12,130,429 B2
(45) Date of Patent: Oct. 29, 2024

(54) HEAD-UP DISPLAY SCREEN, HEAD-UP DISPLAY ASSEMBLY, AND VEHICLE

(71) Applicant: APPOTRONICS CORPORATION LIMITED, Guangdong (CN)

(72) Inventors: Fei Hu, Shenzhen (CN); Lin Wang, Shenzhen (CN); Xiaofeng Tang, Shenzhen (CN); Shijie Li, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 393 days.

(21) Appl. No.: 17/641,618

(22) PCT Filed: Aug. 31, 2020

(86) PCT No.: PCT/CN2020/112637
§ 371 (c)(1),
(2) Date: Mar. 9, 2022

(87) PCT Pub. No.: WO2021/057400
PCT Pub. Date: Apr. 1, 2021

(65) Prior Publication Data
US 2022/0326517 A1 Oct. 13, 2022

(30) Foreign Application Priority Data
Sep. 23, 2019 (CN) .......................... 201910900809.2

(51) Int. Cl.
*G02B 27/01* (2006.01)
*B60K 35/00* (2024.01)

(52) U.S. Cl.
CPC .......... *G02B 27/0101* (2013.01); *B60K 35/00* (2013.01); *B60K 2360/23* (2024.01); *G02B 2027/0196* (2013.01)

(58) Field of Classification Search
CPC ... G02B 27/01–0189; G02B 2027/0105–0198; B60K 35/00; B60K 2360/23
See application file for complete search history.

(56) References Cited

U.S. PATENT DOCUMENTS

| 2010/0073579 A1* | 3/2010 | Okada ................ G02B 27/0101 |
| | | 348/744 |
| 2017/0059862 A1 | 3/2017 | Martinez |
| 2019/0162959 A1* | 5/2019 | Lee ........................ G02B 27/18 |

FOREIGN PATENT DOCUMENTS

| CN | 105501123 | 4/2016 |
| CN | 109308843 | 2/2019 |

(Continued)

OTHER PUBLICATIONS

International Search Report for corresponding International Application PCT/CN2020/112637, mailed Nov. 30, 2020.

*Primary Examiner* — Bao-Luan Q Le
*Assistant Examiner* — Christopher A Lamb, II
(74) *Attorney, Agent, or Firm* — Burris Law, PLLC (57) ABSTRACT

A head-up display screen, a head-up display assembly, and a vehicle are provided. The head-up display screen is attached to an inner side of an attachment surface of a windshield and configured to reflect image light emitted towards the windshield. The head-up display screen includes a functional layer, a reflective layer, and a protective layer that are sequentially arranged in a direction from the windshield to a driving position. The functional layer includes prism microstructures protruding from the inner side of the attachment surface of the windshield. The reflective layer is at least attached to lower inclined surfaces of the prism microstructures and is configured to reflect the image light towards the driving position. The protective layer covers the reflective layer and the functional layer.

18 Claims, 5 Drawing Sheets

(56) References Cited

FOREIGN PATENT DOCUMENTS

| JP | 2006091104 | 4/2006 |
| JP | 2014206593 | 10/2014 |
| JP | 2016188962 | 11/2016 |

\* cited by examiner

HEAD-UP DISPLAY SCREEN, HEAD-UP DISPLAY ASSEMBLY, AND VEHICLE

CROSS-REFERENCE TO RELATED APPLICATIONS

This application is a National Phase of International Application No. PCT/CN2020/112637, filed on Aug. 31, 2020, which claims priority to and the benefit of CN 201910900809.2, filed on Sep. 23, 2019. The disclosures of the above applications are incorporated herein by reference.

FIELD

The present disclosure relates to the technical field of optics, and specifically, to a head-up display screen, a head-up display assembly, and a vehicle.

BACKGROUND

The statements in this section merely provide background information related to the present disclosure and may not constitute prior art.

A head-up display (HUD), also referred to as a head-up display system, is an apparatus for projecting instrument-related information onto a front windshield. HUD screen products on the market are mainly classified into a rear-mounted HUD and a front-mounted HUD.

SUMMARY

This section provides a general summary of the disclosure and is not a comprehensive disclosure of its full scope or all of its features.

The present disclosure is intended to provide a head-up display screen, a head-up display assembly, and a vehicle, to solve the above problems.

The above objectives of embodiments of the present disclosure are achieved by using the following technical solutions.

According to an aspect, the present disclosure provides a head-up display screen, which is attached to an inner side of an attachment surface of a windshield and configured to reflect image light emitted towards the windshield. The head-up display screen includes a functional layer, a reflective layer, and a protective layer that are sequentially arranged in a direction from the windshield to a driving position. The functional layer includes prism microstructures protruding from the inner side of the attachment surface of the windshield. The reflective layer is at least attached to lower inclined surfaces of the prism microstructures and is configured to reflect the image light towards the driving position. The protective layer covers the reflective layer and the functional layer.

According to another aspect, the present disclosure further provides a head-up display assembly, including an image source, a windshield, and the head-up display screen according to any one of the above implementations. The head-up display screen is attached to the windshield, the image source is configured to emit image light and includes an image generation unit and an optical element that is a reflective curved mirror or a convergent lens, and light rays emitted by the image generating unit are incident on the head-up display screen after processed by the optical element.

According to still another aspect, the present disclosure further provides a vehicle, including a vehicle body and the head-up display assembly provided in the second aspect, and the windshield is installed on the vehicle body.

Compared with the related art, the HUD screen provided in the present disclosure includes the functional layer, the reflective layer, and the protective layer that are sequentially arranged, and the functional layer includes the prism microstructures protruding from the inner side of the attachment surface of the windshield, so that a main virtual image and a ghost virtual image of the incident image light can be separated from each other, thereby effectively solving a ghost problem of a head-up display.

These or other aspects of the present disclosure will be more concise and understandable in the description of the following embodiments.

Further areas of applicability will become apparent from the description provided herein. It should be understood that the description and specific examples are intended for purposes of illustration only and are not intended to limit the scope of the present disclosure.

DRAWINGS

To describe the technical solutions in the embodiments of the present disclosure more clearly, the drawings required to describe the embodiments are briefly described below. The drawings described below are only some embodiments of the present disclosure. Those of ordinary skill in the art may further obtain other drawings based on these drawings without creative efforts.

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to facilitate the understanding of the present disclosure, the embodiments of the present disclosure are described more completely below with reference to the accompanying drawings. The accompanying drawings show embodiments of the present disclosure. The present closure is embodied in various forms without being limited to the implementations set forth herein. Rather, these implementations are provided so that the content disclosure in the present disclosure will be understood more thoroughly and comprehensively.

Unless otherwise defined, all technical and scientific terms used herein have the same meaning as commonly understood by those skilled in the technical field of the present disclosure. The terms used in the embodiments of the present disclosure herein are only for the purpose of describing specific implementations, and are not intended to limit the present disclosure.

The rear-mounted HUD uses an auxiliary display screen as a combiner for displaying a virtual image, such that the virtual image displayed by the HUD is well fused with an external scenery. Generally, the rear-mounted HUD is cheap and structurally compact. However, the rear-mounted HUD also has some limitations, for example, field-of-view and window ranges are relatively small. The combiner affects a user's sight during driving, affecting user's experience. The front-mounted HUD directly uses a windshield as the combiner to project content required by the user onto the front windshield by using an optical system. A virtual image displayed by the HUD and an external scenery can be observed simultaneously with human eyes within a head-up range by using the windshield, which not only improves driving safety, but also makes driving more comfortable.

Generally, the front-mounted HUD system suffers a HUD ghost. Due to that the traditional front windshield has a given thickness, a light ray emergent from a HUD module is reflected by an inner surface and an outer surface of the traditional front windshield, and then an overlapping image is formed, that is, the HUD ghost is formed. At present, a wedge-shaped front windshield is used to avoid a ghost. The wedge angle can be controlled to make an optical path of a main virtual image coincide with an optical path of a ghost virtual image. However, the wedge-shaped windshield has a high cost and a high processing difficulty, which is difficult to meet a demand.

Figure 1:
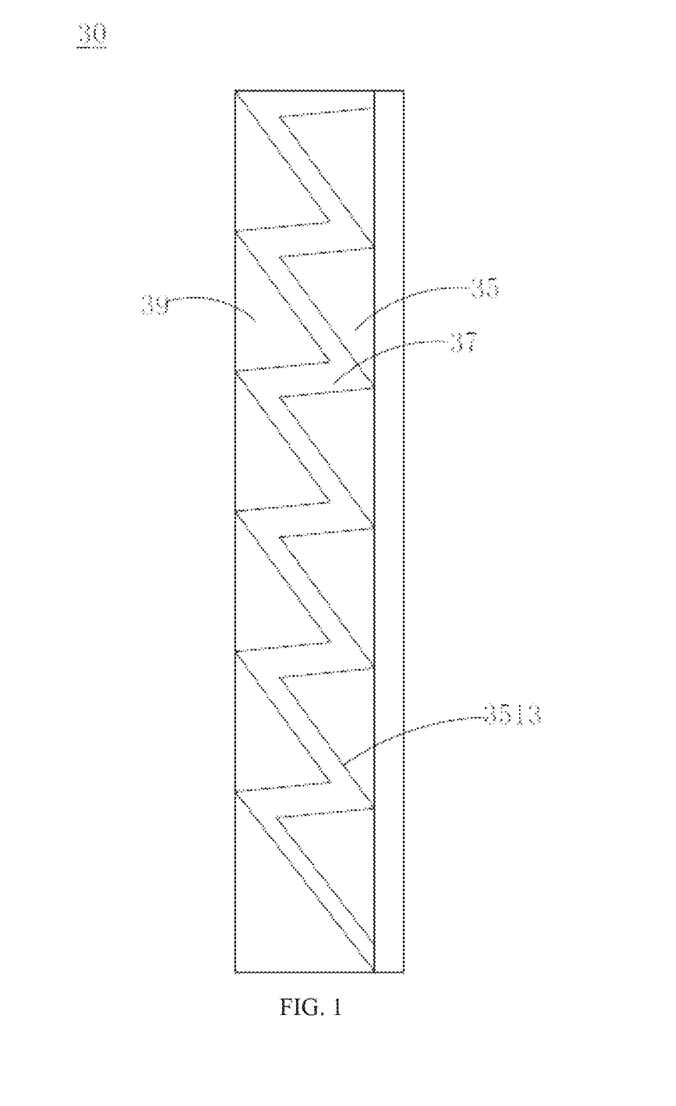
FIG. 1 is a schematic diagram of a head-up display screen according to an embodiment of the present disclosure.
Figure 2:
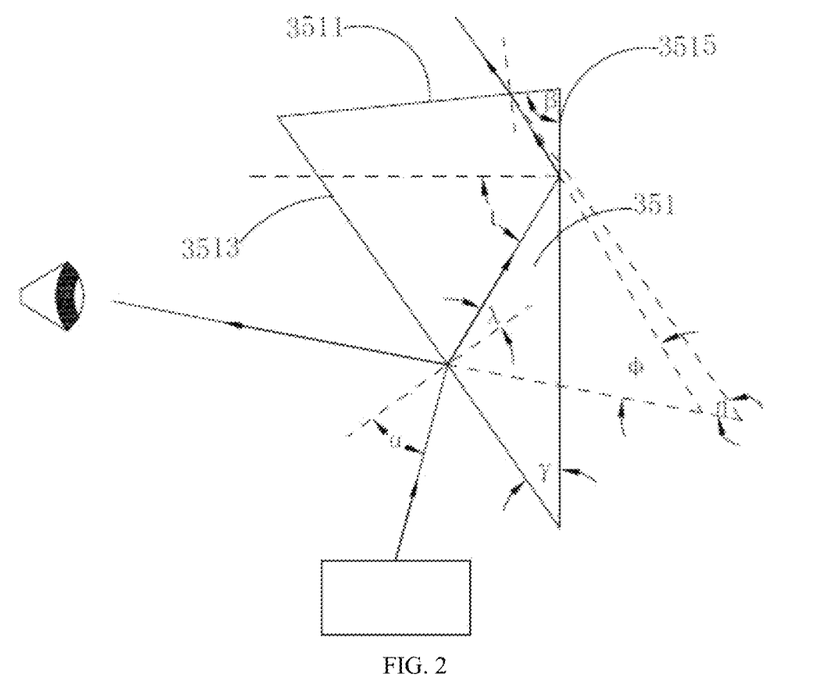
FIG. 2 is an optical path diagram of a head-up display screen according to an embodiment of the present disclosure.

Referring to FIG. 1 and FIG. 2, a head-up display screen 30 provided in the present disclosure is attached to an inner side of an attachment surface of a windshield and configured to reflect image light emitted towards the windshield. The head-up display screen 30 includes a functional layer 35, a reflective layer 37, and a protective layer 39 that are sequentially arranged from the windshield to a driving position. The functional layer 35 includes multiple prism microstructures 351 protruding from the inner side of the attachment surface of the windshield. The reflective layer 37 is at least attached to a lower inclined surface 3513 of the prism microstructure 351, and is configured to reflect the image light to the direction of the driving position. The protective layer 39 covers the reflective layer 37 and the functional layer 35.

In an implementation, a cross section of one of the prism microstructures is triangular or trapezoidal, and an interior angle of a cross section of one of the prism microstructures corresponding to an upper inclined surface of the prism microstructure is an acute angle.

In an implementation, one of the prism microstructures further includes a side surface attached to the inner side of the attachment surface of the windshield and connected between the upper inclined surface and the lower inclined surface; wherein incident image light is reflected by the lower inclined surface to form first emergent light, and the incident image light is sequentially refracted by the lower inclined surface, reflected by the side surface, and refracted by the upper inclined surface to form second emergent light, which is expressed as:

$$\eta = \gamma - \alpha + \beta - a\sin\left\{n \times \sin\left[\beta - a\sin\left(\frac{\sin\alpha}{n}\right) - \alpha\right]\right\},$$

where η represents an included angle between the first emergent light and the second emergent light, n represents a refractive index of the functional layer, α represents an included angle between the incident image light and a normal line of the lower inclined surface, β represents an included angle between the upper inclined surface and the side surface, and γ represents an included angle between the lower inclined surface and the side surface.

In an implementation, the included angle between the first emergent light and the second emergent light is greater than 10 degrees.

In an implementation, one of the prism microstructures has a Fresnel structure or a black grid structure.

In an implementation, a width of one of the prism microstructures on the attachment surface of the windshield ranges from 0.01 mm to 1 mm.

In an implementation, the head-up display screen further includes a bonding layer and a substrate that are attached to each other, the bonding layer is located between the windshield and the functional layer, and the substrate is located between the bonding layer and the functional layer.

In an implementation, the protective layer has a same refractive index as the functional layer.

In an implementation, the reflective layer includes a plurality of superimposed transparent medium layers.

In an implementation, reflectivity of one of the prism microstructures decreases first and then increases as a refractive index of the protective layer increases.

In the embodiment, the head-up display screen 30 is of a thin film and can be attached to the windshield. The head-up display screen 30 can be attached to the windshield through bonding or electrostatic adsorption. The head-up display screen 30 can further be configured to reflect the image light emitted towards the windshield. The head-up display screen 30 can be rectangular, circular, fan-shaped, oval, diamond-shaped, or trapezoidal, provided that information can be completely displayed on the windshield.

The head-up display screen 30 includes the functional layer 35, the reflective layer 37, and the protective layer 39 that are sequentially arranged from the windshield to the driving position, in other words, the reflective layer 37 is located between the functional layer 35 and the protective layer 39.

The functional layer 35 includes multiple prism microstructures 351 protruding from the inner side of the attachment surface of the windshield, and a width of the prism microstructure 351 on the attachment surface of the windshield ranges from 0.01 mm to 1 mm. In an embodiment, a cross section of the prism microstructure 351 is triangular or trapezoidal, and the prism microstructure 351 includes an upper inclined surface 3511, the lower inclined surface 3513, and a side surface 3515. The side surface 3515 is attached to the inner side of the attachment surface of the windshield and is connected between the upper inclined surface 3511 and the lower inclined surface 3513. An interior angle of a cross section corresponding to the upper inclined surface 3511 of the prism microstructure 351 is an acute angle, in other words, an included angle between the upper inclined surface 3511 and the side surface 3515 is an acute angle, to demould a mold when manufacturing the prism microstructure 351 through molding. The lower inclined surface 3513 can reflect and refract an incident light ray to separate the light ray.

In another implementation, the cross section of the prism microstructure 351 can be in another shape, provided that the side surface 3515 is attached to the inner side of the attachment surface of the windshield, the interior angle of the cross section corresponding to the upper inclined surface 3511 is the acute angle, and the lower inclined surface 3513 reflects incident image light towards the driving position.

In an embodiment, an included angle between the lower inclined surface 3513 and the side surface 3515 is an operating angle $\gamma$, and $\gamma=(\theta 2-\theta 1)$, where $\theta 2$ represents an inclination angle of the windshield in this embodiment, and $\theta 1$ represents an included angle between the windshield and a horizontal line in another implementation. As can be seen from the above formula, when $\theta 2$ is determined, one value of $\theta 1$ corresponds to one operating angle $\gamma$, in other words, an operating angle $\gamma$ of each head-up display screen 30 is determined, and the operating angle $\gamma$ of the prism microstructure 351 can be controlled by selecting a different head-up display screen 30, so as to change a propagation path of light rays.

The incident image light is reflected by the lower inclined surface 3513 to form first emergent light L1. An optical path of the first emergent light L1 is an optical path of a ghost virtual image. The incident image light is sequentially refracted by the lower inclined surface 3513, reflected by the side surface 3515, and refracted by the upper inclined surface 3511, to form second emergent light L2. An optical path of the second emergent light L2 is an optical path of a main virtual image.

An included angle between the light path of the main virtual image and the light path of the ghost virtual image, namely, a separation angle n between the main virtual image and the ghost virtual image, is equal to an included angle between the first emergent light L1 and the second emergent light L2. In an embodiment, the following formulas are satisfied:

$$n \times \sin \lambda = \sin \alpha; \quad \text{formula 1:}$$

$$90+\lambda+\gamma=90+\iota; \quad \text{formula 2:}$$

$$\varphi+\alpha+\lambda=2\iota; \text{ and} \quad \text{formula 3:}$$

$$a \sin[n \times \sin(\beta-\iota)]-(\beta-\iota)+\eta=\varphi. \quad \text{formula 4:}$$

A formula of the separation angle $\eta$ between the main virtual image and the ghost virtual image can be deduced from the formulas 1 to 4, and is expressed as follows:

$$\eta = \gamma - \alpha + \beta - a\sin\left\{n \times \sin\left[\beta - a\sin\left(\frac{\sin\alpha}{n}\right) - \alpha\right]\right\},$$

where n represents a refractive index of the functional layer 35; $\alpha$ represents an included angle between the incident image light and a normal line of the lower inclined surface 3513; $\beta$ represents the included angle between the upper inclined surface 3511 and the side surface 3515, and $0°<\beta<90°$; and $\gamma$ represents the operating angle of the prism microstructure 351, namely, the included angle between the lower inclined surface 3513 and the side surface 3515. $\lambda$ represents an included angle between a light ray incident on the side surface 3515 and the normal line of the lower inclined surface 3513, represents an included angle between the light ray incident on the side surface 3515 and the horizontal line, and $\varphi$ represents an included angle between the first emergent light L1 and a light ray emergent from the side surface 3515.

Figure 3:
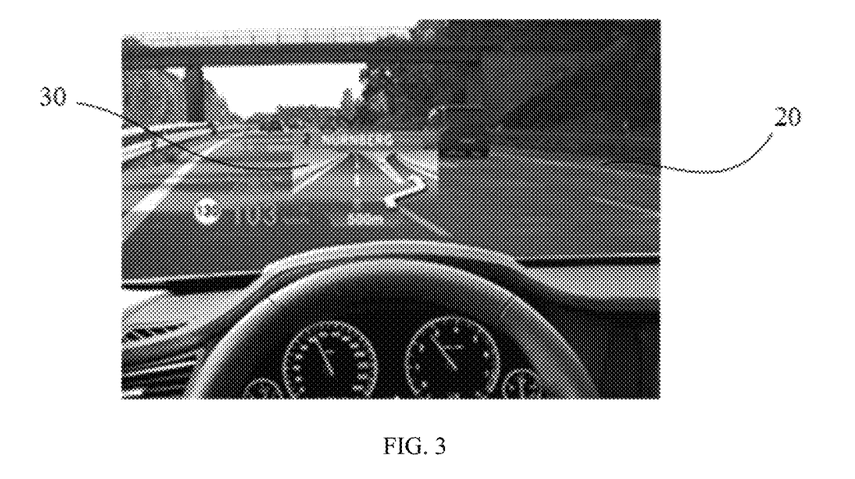
FIG. 3 shows an effect of attaching a head-up display screen to a windshield according to an embodiment of the present disclosure.

It can be learned from the above formula that the separation angle $\eta$ between the main virtual image and the ghost virtual image is related to the included angle $\alpha$ between the incident image light and the normal line of the lower inclined surface 3513, the included angle $\beta$ between the upper inclined surface 3511 and the side surface 3515, the included angle $\gamma$ between the lower inclined surface 3513 and the side surface 3515, and the refractive index n of the functional layer 35. In practical application, $\gamma$, $\alpha$, $\beta$, and the refractive index n can be selected properly to achieve different ghost separation angles $\eta$. In an embodiment, the included angle between the first emergent light L1 and the second emergent light L2 is greater than 10 degrees, in other words, the separation angle $\eta$ between the main virtual image and the ghost virtual image is greater than 10 degrees. In this way, human eyes can see the main virtual image instead of the ghost virtual image on the windshield, and instrument panel information and other relevant information can be clearly displayed on the windshield, effectively resolving a ghost problem. Those skilled in the art can understand the separation angle $\eta$ between the main virtual image and the ghost virtual image can be smaller than or equal to 10 degrees, provided that the instrument panel information and other relevant information can be clearly displayed on the windshield, as shown in FIG. 3.

In an embodiment, the prism microstructure 351 can have a Fresnel structure or a black grid structure. The prism microstructure 351 can absorb interference light and reflect the incident image light, so as to improve clearness of projection imaging.

Figure 4:
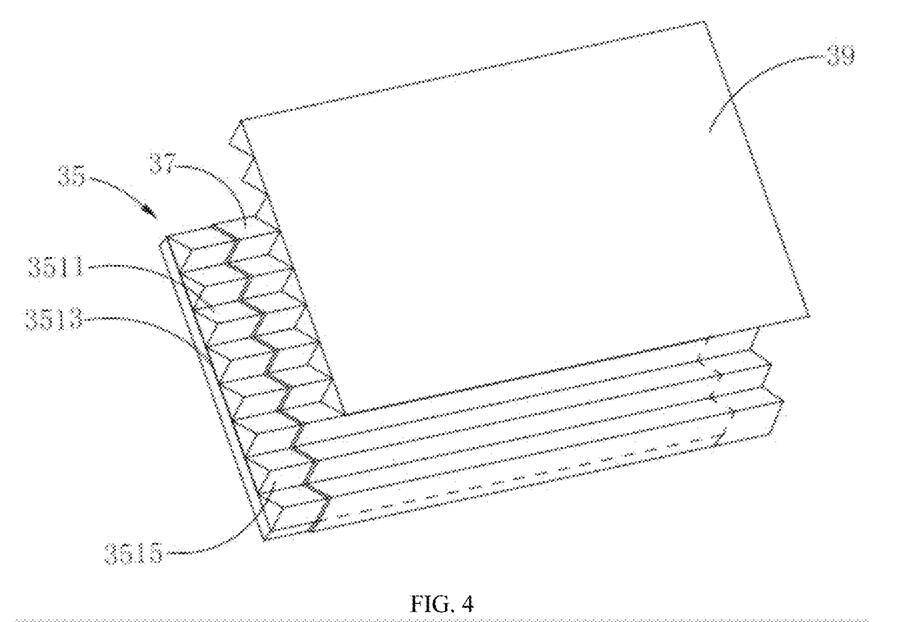
FIG. 4 is a three-dimensional schematic diagram of a head-up display screen according to an embodiment of the present disclosure.

Referring to FIG. 4, a cross section of the reflective layer 37 is serrated in a direction perpendicular to the windshield. The reflective layer 37 can reflect the image light towards the driving position. The reflective layer 37 can be attached to the prism microstructure 351 through spraying, printing, vacuum evaporation, or vacuum splattering. In an embodiment, the reflective layer 37 is at least attached to the lower inclined surface 3513 of the prism microstructure 351. In another implementation, the reflective layer 37 can be attached to the upper inclined surface 3511 of the prism microstructure 351.

In an embodiment, the reflective layer 37 is a high-reflectivity thin film made from a compound material, which can be configured to reflect incident light rays and reduce a transmission loss of the light rays. The reflective layer 37 can include superimposed transparent medium layers. The transparent medium layers are all made from non-metallic materials, and reflectivity of the head-up display screen 30 can be controlled according to a thickness of the transparent medium layer.

In another implementation, the reflective layer 37 can be a high-reflectivity thin film made from a metallic material, and a material of the reflective layer 37 includes metal. The material of the reflective layer 37 is at least one of metallic materials such as aluminum, silver, copper, and gold.

A cross-sectional shape of the protective layer 39 is roughly the same as a cross-sectional shape of the functional layer 35. In other words, the protective layer 39 includes multiple microstructures, and a cross section of the microstructure is triangular or trapezoidal. The protective layer 39 covers the reflective layer 37 and the functional layer 35. The protective layer 39 can effectively protect the prism microstructure 351 of the head-up display screen 30 from being damaged.

Figure 5:
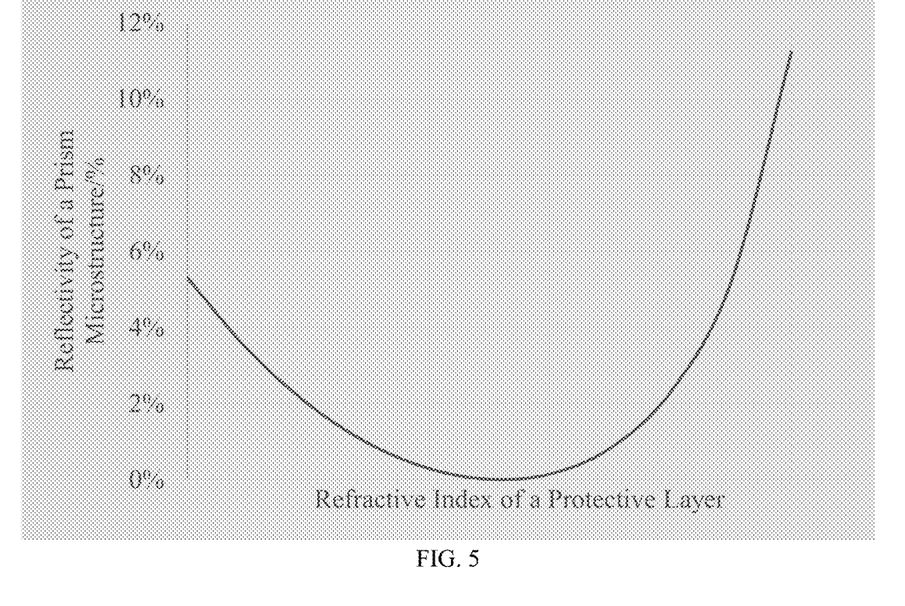
FIG. 5 shows a curve indicating a relationship between a refractive index of a protective layer and reflectivity of a prism microstructure according to an embodiment of the present disclosure.

Referring to FIG. 5, in an embodiment, reflectivity of a light ray incident on an interface between the protective layer 39 and the prism microstructure 351 can be controlled by controlling the refractive index of the protective layer 39 or the functional layer 35, so as to control relative brightness of a virtual image and an external environment. When the prism microstructure 351 is made from PET (with a refractive index n of 1.52), and an angle of the light ray incident on the interface between the protective layer 39 and the prism microstructure 351 is 45°, reflectivity of the prism microstructure 351 decreases first and then increases as the refractive index of the protective layer 39 increases.

In another implementation, the protective layer 39 and the functional layer 35 are made from a same material, in other words, the refractive index of the protective layer 39 can be the same as that of the functional layer 35, so as to avoid a case that a deformed external scenery is observed due to a difference between refractive indexes.

Figure 6:
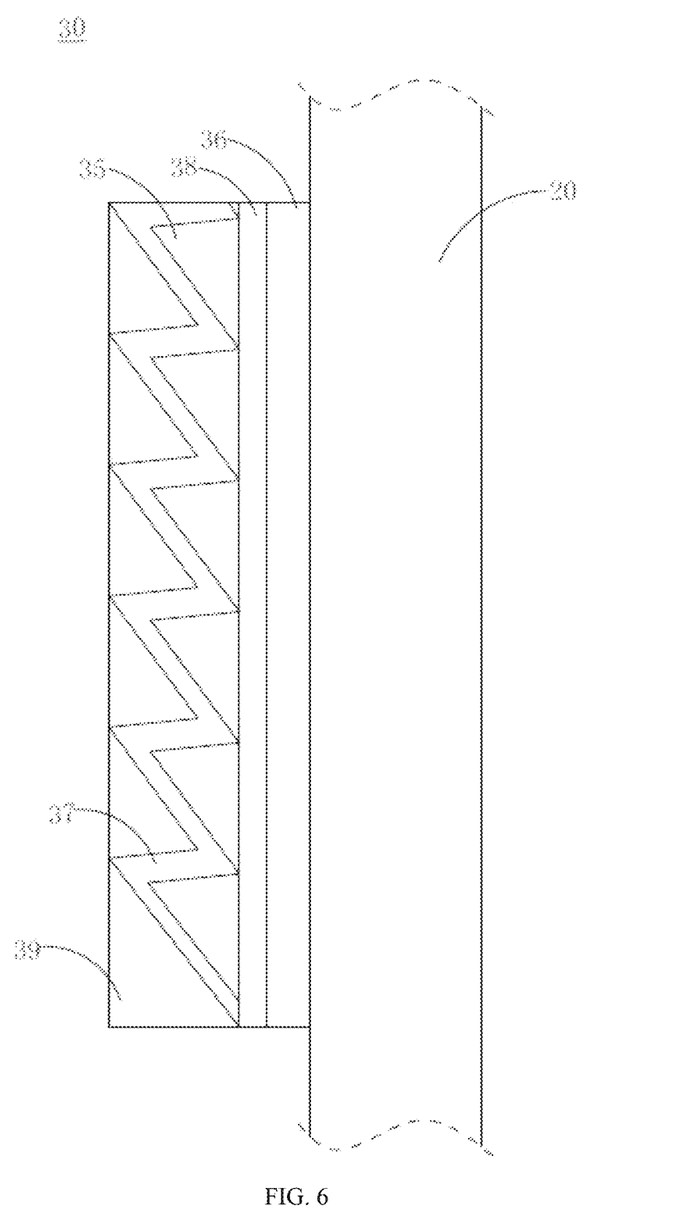
FIG. 6 is a schematic diagram of another head-up display screen according to an embodiment of the present disclosure.

Referring to FIG. 6, in another implementation, the head-up display screen 30 further includes a bonding layer 36 and a substrate 38 that are attached to each other. The bonding layer 36 is located between the windshield and the functional layer 35. The bonding layer can be made from epoxy adhesive or another high-transmittance bonding material. The substrate 38 is located between the bonding layer 36 and the functional layer 35. The substrate 38 can include transparent organic materials, such as polycarbonate (PC), poly methyl methacrylate (PMMA), PVC, and PET.

When the head-up display screen 30 is prepared, the substrate 38 can be provided first. After that, the functional layer 35 is prepared on the substrate 38 through hot embossing or UV glue transfer, the reflective layer 37 is formed on the functional layer 35 by using a coating process, the protective layer 39 is prepared on the reflective layer 37 through hot embossing or by using another process, and finally the bonding layer 36 is coated on a side, away from the functional layer 35, of the substrate 38, and release paper is pasted on a side, away from the substrate 38, of the bonding layer 36. In this way, after the release paper is removed, the HUD screen 30 can be pasted on the windshield by using the bonding layer 36.

To sum up, the HUD screen 30 provided in the present disclosure includes the functional layer 35, the reflective layer 37, and the protective layer 39 that are sequentially arranged, and the functional layer 35 includes the prism microstructures 351 protruding from the inner side of the attachment surface of the windshield, so that the main virtual image and the ghost virtual image of the incident image light are separated from each other, thereby effectively resolve a ghost problem of a HUD.

Figure 7:
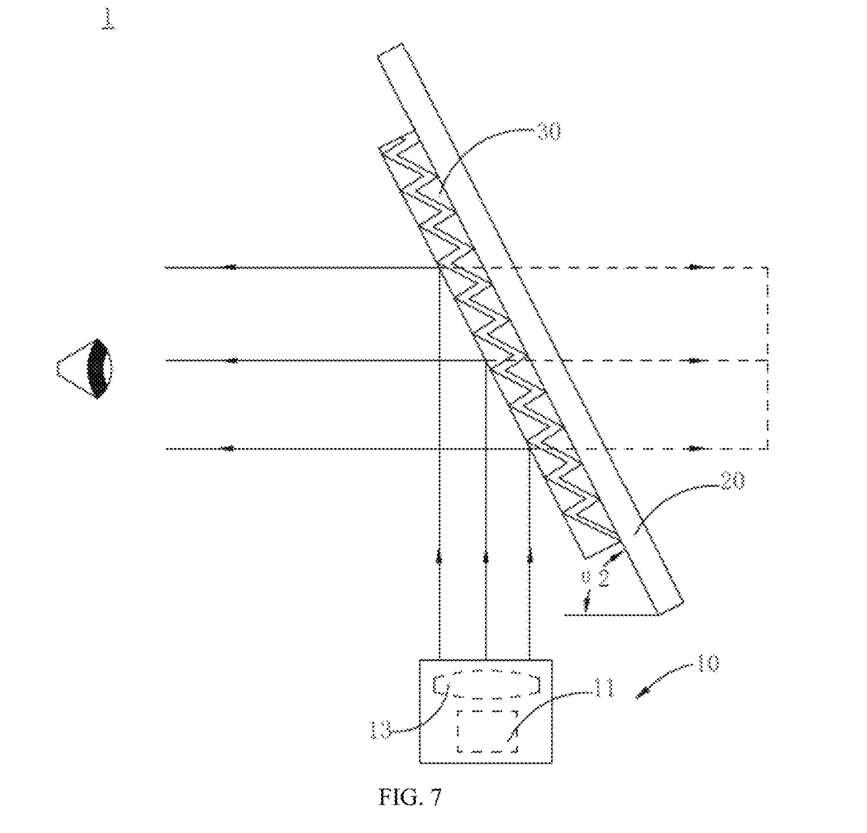
FIG. 7 is a schematic diagram of a head-up display assembly according to an embodiment of the present disclosure.

Referring to FIG. 7, the present disclosure further provides a head-up display assembly 1, and the head-up display assembly includes an image source 10, a windshield 20, and the head-up display screen 30 described in any one of the above implementations. The head-up display screen 30 is attached to the windshield 20. The image source 10 is configured to emit image light, and the image source 10 includes an image generation unit 11 and an optical element 13. The optical element 13 is a reflective curved mirror or a convergent lens, and light rays emitted by the image generating unit 11 are incident on the head-up display screen 30 after processed by the optical element 13.

In an embodiment, the image source 10 includes the image generation unit 11 and the optical element 13, and the light rays emitted from the image generation unit 11 is emitted after being processed by the optical element 13. The image generation unit 11 may be an LCD or a digital light processor (DLP). The optical element 13 can be the convergent lens, and is configured to converge the light rays emitted from the image generation unit 11 to form convergent light to be emitted. The light rays emitted from the image generation unit 11 can be information on an instrument panel, or can be important information such as traffic information, or other information.

In another implementation, the image source 10 can include the reflective curved mirror. The reflective curved mirror is configured to reflect the light rays. A structure of the image source 10 can be designed based on an actual requirement.

The windshield 20 is opposite to the image source 10. The windshield 20 can reflect the light rays emitted from the image source 10 and then make the reflected light rays incident on human eyes, such that the human eyes can see a distant virtual image from intuitive feeling. In this way, relevant instrument information can be mapped onto the windshield 20. In an embodiment, an inclination angle of the windshield 20 is θ2, in other words, an included angle between the windshield 20 and a horizontal line is θ2.

The head-up display screen 30 can be directly attached to the windshield 20. The head-up display screen 30 can be attached to the windshield 20 through bonding or electrostatic adsorption. The plane display screen can be configured to perform imaging on an image projected by the image source 10 to the windshield 20. In this way, a virtual image displayed by a head-up display and an external scenery can be observed simultaneously with the human eyes within a head-up range by using the windshield 20, which not only improves driving safety, but also makes driving more comfortable. In an embodiment, reflectivity of the head-up display screen 30 ranges from 5% to 60%, for example, can be about 10%. When the reflectivity of the HUD screen 30 is too high, for example, greater than 60%, a field of view of a driver for watching a scenery outside a window is affected. When the reflectivity of the HUD screen 30 is too low, for example, less than 5%, it is difficult for the human eyes to observe relevant information, of an instrument panel, projected on the windshield 20, and a head-up display effect is not obvious.

Figure 8:
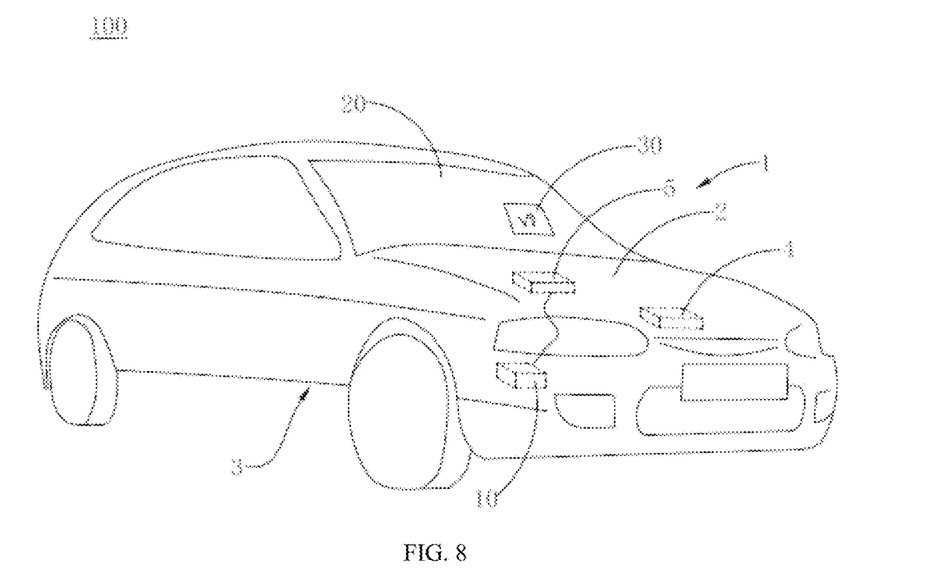
FIG. 8 is a schematic diagram of a vehicle according to an embodiment of the present disclosure.

Referring to FIG. 8, the present disclosure further provides a vehicle 100. The vehicle 100 includes a vehicle body 2, an underpan 3, a power system 4, an electrical system 5, and a head-up display assembly 1. An image source 10 of the head-up display assembly 1 can be installed inside the vehicle 100, for example, the vehicle body 2 or the underpan 3, and is electrically connected to the electrical system 5. The head-up display screen 30 is attached to the windshield 20. The windshield 20 is installed on the vehicle body 2. The vehicle body 2, the power system 4, the underpan 3, and the electrical system 5 can be referred to the related art and will not be repeated herein.

The above embodiments are merely several implementations of the present disclosure. Although the description is specific and detailed, it should not limit the patent scope of the present disclosure. It should be noted that those of ordinary skill in the art can further make several variations and improvements without departing from the concept of the present disclosure. These variations and improvements all fall within the protection scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A head-up display screen, wherein the head-up display screen is attached to an inner side of an attachment surface of a windshield and is configured to reflect image light emitted towards the windshield,
wherein the head-up display screen comprises:
a functional layer comprises prism microstructures protruding from the inner side of the attachment surface of the windshield,
a reflective layer at least attached to a lower inclined surface of each of the prism microstructures, and
a protective layer covering the reflective layer and the functional layer, wherein the functional layer, the reflective layer, and the protective layer are sequentially arranged in a direction from the windshield to a driving position,
wherein the reflective layer is configured to reflect the image light towards the driving position; and
wherein the head-up display screen further comprises a bonding layer and a substrate that are attached to each other, wherein the bonding layer is located between the windshield and the functional layer, and wherein the substrate is located between the bonding layer and the functional layer.

2. The head-up display screen according to claim 1, wherein a cross section of one of the prism microstructures is triangular or trapezoidal, and an interior angle of a cross section of one of the prism microstructures corresponding to an upper inclined surface of the prism microstructure is an acute angle.

3. The head-up display screen according to claim 2, wherein one of the prism microstructures further comprises a side surface attached to the inner side of the attachment surface of the windshield and connected between the upper inclined surface and the lower inclined surface; wherein incident image light is reflected by the lower inclined surface to form first emergent light, and the incident image light is sequentially refracted by the lower inclined surface, reflected by the side surface, and refracted by the upper inclined surface to form second emergent light, which is expressed as:

$$\eta = \gamma - \alpha + \beta - a\sin\left\{n \times \sin\left[\beta - a\sin\left(\frac{\sin\alpha}{n}\right) - \alpha\right]\right\},$$

where η represents an included angle between the first emergent light and the second emergent light, n represents a refractive index of the functional layer, α represents an included angle between the incident image light and a normal line of the lower inclined surface, β represents an included angle between the upper inclined surface and the side surface, and γ represents an included angle between the lower inclined surface and the side surface.

4. The head-up display screen according to claim 3, wherein the included angle between the first emergent light and the second emergent light is greater than 10 degrees.

5. The head-up display screen according to claim 1, wherein one of the prism microstructures has a Fresnel structure or a black grid structure.

6. The head-up display screen according to claim 1, wherein a width of one of the prism microstructures on the attachment surface of the windshield ranges from 0.01 mm to 1 mm.

7. The head-up display screen according to claim 1, wherein the protective layer has a same refractive index as the functional layer.

8. The head-up display screen according to claim 1, wherein the reflective layer comprises superimposed transparent medium layers.

9. The head-up display screen according to claim 8, wherein the reflective layer is further attached to upper inclined surfaces of the prism microstructures.

10. The head-up display screen according to claim 8, wherein the superimposed transparent medium layers are made of made from non-metallic materials.

11. The head-up display screen according to claim 1, wherein reflectivity of one of the prism microstructures decreases first and then increases as a refractive index of the protective layer increases.

12. The head-up display screen according to claim 11, wherein the prism microstructure has a refractive index of 1.52, and an angle of light ray incident on an interface between the protective layer and one of the prism microstructures is 45°.

13. The head-up display screen according to claim 1, wherein reflectivity of the head-up display screen ranges from 5% to 60%.

14. A head-up display assembly, comprising:
an image source configured to emit image light and comprising an image generation unit and an optical element that is a reflective curved mirror or a convergent lens;
a windshield; and
a head-up display screen,
wherein the head-up display screen is attached to the windshield, wherein light rays emitted by the image generating unit are incident on the head-up display screen after being processed by the optical element; and
wherein the head-up display screen is attached to an inner side of an attachment surface of the windshield and is configured to reflect the image light emitted towards the windshield;
wherein the head-up display screen comprises:
a functional layer comprising prism microstructures protruding from the inner side of the attachment surface of the windshield, a reflective layer at least attached to a lower inclined surface of each of the prism microstructures, and a protective layer covering the reflective layer and the functional layer, wherein the functional layer, the reflective layer, and the protective layer are sequentially arranged in a direction from the windshield to a driving position, and wherein the reflective layer is configured to reflect the image light towards the driving position, and wherein the head-up display screen further comprises a bonding layer and a substrate that are attached to each other, wherein the bonding layer is located between the windshield and the functional layer, and wherein the substrate is located between the bonding layer and the functional layer.

15. A vehicle, comprising a vehicle body and the head-up display assembly according to claim 14, wherein the windshield is installed on the vehicle body.

16. The head-up display assembly according to claim 14, wherein one of the prism microstructures further comprises a side surface attached to the inner side of the attachment surface of the windshield and connected between an upper inclined surface and the lower inclined surface; wherein incident image light is reflected by the lower inclined surface to form first emergent light, and the incident image light is sequentially refracted by the lower inclined surface, reflected by the side surface, and refracted by the upper inclined surface of the prism microstructure to form second emergent light, which is expressed as:

$$\eta = \gamma - \alpha + \beta - a\sin\left\{n \times \sin\left[\beta - a\sin\left(\frac{\sin\alpha}{n}\right) - \alpha\right]\right\},$$

where η represents an included angle between the first emergent light and the second emergent light, n represents a refractive index of the functional layer, α represents an included angle between the incident image light and a normal line of the lower inclined surface, β represents an included angle between the upper inclined surface and the side surface, and γ represents an included angle between the lower inclined surface and the side surface.

17. The head-up display screen according to claim 16, wherein the included angle between the first emergent light and the second emergent light is greater than 10 degrees.

18. The head-up display screen according to claim 14, wherein a width of one of the prism microstructures on the attachment surface of the windshield ranges from 0.01 mm to 1 mm.

* * * * *